United States Patent
Hutcheson et al.

(10) Patent No.: US 7,484,930 B2
(45) Date of Patent: Feb. 3, 2009

(54) NOISE REDUCTION OF AIRCRAFT FLAP

(75) Inventors: Florence V. Hutcheson, Virginia Beach, VA (US); Thomas F. Brooks, Seaford, VA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 9 days.

(21) Appl. No.: 11/169,256

(22) Filed: Jun. 22, 2005

(65) Prior Publication Data

US 2007/0020099 A1    Jan. 25, 2007

(51) Int. Cl.
*B64C 23/00*    (2006.01)
(52) U.S. Cl. .................................... 415/119; 416/231 B
(58) Field of Classification Search ............. 416/146 R, 416/231 R, 231 B, 500, 20 R; 415/119
See application file for complete search history.

(56) References Cited

U.S. PATENT DOCUMENTS

| | | | | |
|---|---|---|---|---|
| 3,012,740 A | * | 12/1961 | Wagner | 244/208 |
| 3,596,854 A | * | 8/1971 | Haney, Jr. | 244/199.3 |
| 3,669,386 A | * | 6/1972 | Jacobs et al. | 244/52 |
| 3,881,669 A | * | 5/1975 | Lessen | 244/199.3 |
| 5,158,251 A | * | 10/1992 | Taylor | 244/199.3 |
| 7,100,875 B2 | * | 9/2006 | Shmilovich et al. | 244/199.4 |

OTHER PUBLICATIONS

Brooks, T.F. & Humphreys, W.M.Jr., "Flap Edge Aeroacoustic Measurements and Predictions," AIAA 2000-1975.
Koop, et al, "Reduction of Flap Side Edge Noise by Active Flow Control," AIAA 2002-2469.
Hutcheson, Florence V. & Stead, Daniel J., "PIV Measurements on a Blowing Flap," AIAA 2005-0212.

* cited by examiner

*Primary Examiner*—Ninh H Nguyen
(74) *Attorney, Agent, or Firm*—Helen M. Galus

(57) ABSTRACT

A reduction in noise radiating from a side of a deployed aircraft flap is achieved by locating a slot adjacent the side of the flap, and then forcing air out through the slot with a suitable mechanism. One, two or even three or more slots are possible, where the slot is located at one or more locations selected from a group of locations comprising a top surface of the flap, a bottom surface of the flap, an intersection of the top and side surface of the flap, an intersection of the bottom and side surfaces of the flap, and a side surface of the flap. In at least one embodiment the slot is substantially rectangular. A device for adjusting a rate of the air forced out through the slot can also be provided.

21 Claims, 5 Drawing Sheets

NOISE REDUCTION OF AIRCRAFT FLAP

ORIGIN OF THE INVENTION

The invention described herein was made by employees of the United States Government and may be manufactured and used by or for the Government of the United States of America for governmental purposes without the payment of any royalties thereon or therefor.

BACKGROUND OF THE INVENTION

During airport approach, when the engines of an aircraft are near idle condition and when the high-lift systems and landing gears are deployed, airframe noise is the dominant noise source. The noise that is generated at the side edge of the flaps has been identified as an important airframe noise component and is a target for noise control.

A number of numerical and experimental studies have been conducted in order to identify and model the noise generation mechanisms at the flap side edge. Flow field measurements in the flap side edge region of a wing with a half-span flap have revealed the presence of a 2-vortex system: a small vortex near the flap side edge on the top surface and a stronger side vortex along the lower portion of the flap side edge. As it travels downstream along the flap side edge, the side vortex strengthens and expands. At about mid-chord, it begins to spill over the flap top surface and merges with the small top vortex. The instabilities in this vortex system and in the strong shear layer that originates on the bottom edge of the flap create an unsteady pressure field at the flap side edge causing sound to radiate. It has been determined in the known art (Brooks, T. F. and Humphreys, W. M. Jr.: Flap Edge Aeroacoustic Measurements and Predictions. AIAA 2000-1975), that the dominant flap side edge noise emission region are located around mid-chord on the pressure side of the flap edge and around 60-65% chord on the suction side. These noise emission regions are aft of the front leading edge region where the vortex initially forms—from the leading edge at 0% chord to about 35% of the chord.

Some noise reduction concepts have been evaluated in the known art. For example, in Koop et al., *Reduction of Flap Side Edge Noise by Active Flow Control*, AIAA 2002-2469, some noise reduction was achieved by blowing air into the flap side edge vortex. The air was blown through a series of small round orifices located along the top and bottom side edges of the flap between 13 and 35% chord—where the vortex forms.

BRIEF SUMMARY OF THE INVENTION

In accordance with the present invention, an aircraft flap and method are disclosed which reduce noise radiating from the side of a flap when the flap is deployed. The method targets the noise generation regions of the flap side rather than the vortex formation region of the flap. This reduction in noise is achieved by locating at least one slot adjacent the side of the flap, and then forcing air out through the slot(s) with a suitable mechanism when the flap is deployed.

One, two, or three or more slots are possible, where at least one slot is located at one or more locations on the flap. Possible slot locations can include a top surface of the flap, a bottom surface of the flap, an intersection of the top and side surface of the flap, an intersection of the bottom and side surfaces of the flap, and/or a side surface of the flap.

In at least one embodiment, a device is provided which adjusts a rate of the air forced out through the slot(s). In addition, in at least one embodiment, a forward end of the slot is located into the end of the vortex formation region and the slot extends into the region of maximum noise generation In at least one embodiment, the slot is substantially rectangular.

In at least one embodiment a slot may be comprised of a plurality of sub-slots, or smaller openings, adjacent and aligned with one another, so as to in effect together form an elongated slot, or opening.

It is an object of the present invention to reduce the noise radiating from the side edge of a deployed flap.

It is also an object of the present invention to reduce flap side edge noise by weakening the vortex/shear layer system and/or moving it away from the flap side edge.

Other features and advantages of the present invention are stated in, or apparent from, detailed descriptions of embodiments of the invention found hereinbelow.

DETAILED DESCRIPTION OF THE INVENTION

Figure 1:
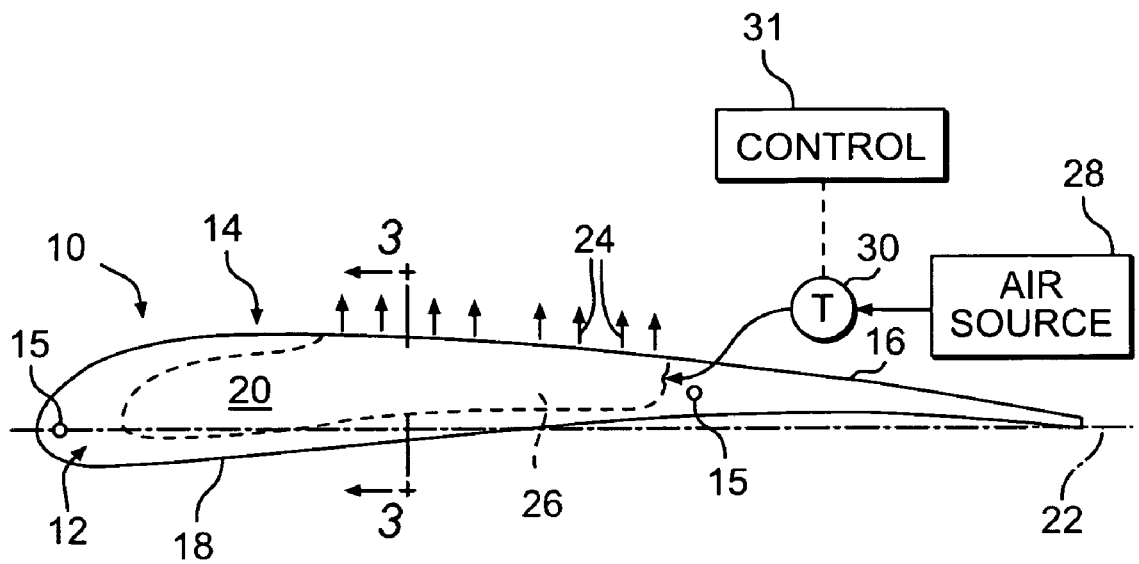
FIG. 1 is a schematic right side elevation view of a first embodiment of an aircraft flap including a cap, or side portion, in accordance with the present invention.
Figure 2:
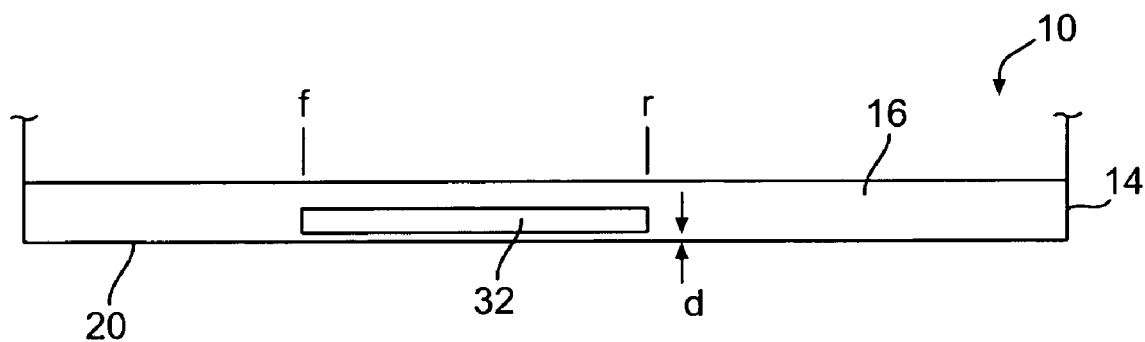
FIG. 2 is a schematic top plan view of the cap depicted in FIG. 1.
Figure 3:
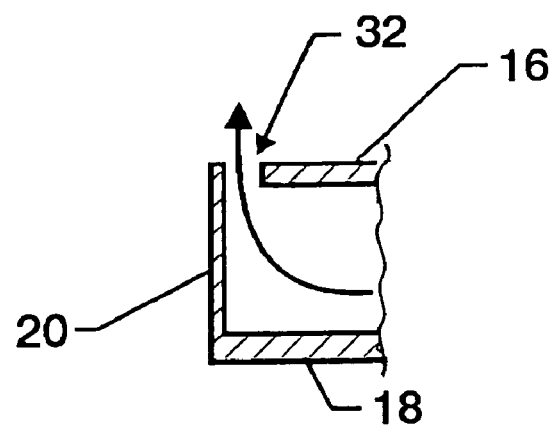
FIG. 3 is a schematic cross sectional right side elevation view of the cap depicted in FIG. 1 taken along the line 3-3.

With reference now to the drawings in which like numerals represent like elements throughout the views, depicted in FIGS. 1-3 is a first experimental embodiment of a deployed aircraft flap 10 in accordance with the present invention. It will be appreciated that an outer side 12 of flap 10 is formed by a cap 14 and is attached by screws 15 to a remainder of flap 10. The use of cap 14 attached to a flap 10 was for convenience in constructing flaps for testing. Thus, it will also be appreciated that in any actual aircraft flap incorporating the present invention, cap 14 would be omitted and the features of the present invention would be integrally incorporated into the outer side or end of the actual flap.

Cap 14 used in the experiments for the present invention has a top surface 16 and a bottom surface 18 which are coextensive with the top and bottom surfaces of flap 10, and a side surface 20 (as if cap 14 were integral). As typical in the art, flap 10 has a chord center line 22 defining a flap chord (length) c along which any dimension x is measured to locate a point therealong, which measurement is expressed as a ratio x/c and which is then referred to as some decimal part of chord or as a percent. Hereafter, the flap dimensions related to c will be so designated.

In order to reduce noise in accordance with the present invention, air is blown or forced out of at least one slot provided in one or more of surfaces 16, 18 and/or 20 of cap 14, as broadly shown by arrows 24 in FIG. 1 directed up from top surface 16. In order to transmit this air to the slot(s), flap 10 is suitably provided with a hollowed out portion 26 or other suitable conduit for the air. A source 28 of the air is provided by a suitable system at a suitable location. A variety of systems are suitable for air source 28 as known in the art, such as a pressurized air bottle, an air bleed from the aircraft engine, a separate air intake from the surrounding moving (relative to the aircraft) air, or the like. As shown, a suitable throttle 30 can be used to control the rate of flow of air to and hence out through the slot, with the initiation and adjustment of throttle 30 being directed by a control 31 which may be part of the aircraft overall control system or dedicated just to the control of air source 28. A suitable location for the air source would, depending upon the source being utilized, be easily determined by one with ordinary skill in the art.

In accordance with a first embodiment of the present invention as shown best in FIGS. 2 and 3, a slot 32 is provided in top surface 16. Slot 32 is rectangular in shape and located a distance d from the side of about 0.0083c. The forward edge f of slot 32 is about 0.27c from the flap leading edge and the rear edge r about 0.60c from the flap leading edge. The dimensions of slot 32 are about 0.167c wide by about 0.33c long, for an open area of about $0.055c^2$. These dimensions are typical of what would be provided for such a flap 10 with tip jet Mach numbers in the range of zero to twice the free stream Mach number (which, as known, during aircraft take off and landing the free stream Mach number is around 0.2). Depicted in FIG. 3 is a cross sectional view through slot 32, showing the flow 24 of air out of slot 32.

Besides the specific slot 32 depicted, other top surface slots can be provided with different locations, numbers, shapes and sizes as desired or determined to be needed for the particular flap or for a particular noise reduction. By way of example, besides the location of slot 32 described above, a similar shaped top surface slot could be provided at other suitable locations, such as at f=0.43 c to r=0.6 c or f=0.5 c to r=0.75 c (or even more) for higher Mach ranges of 0.34 and 0.30 respectively.

Figure 4:
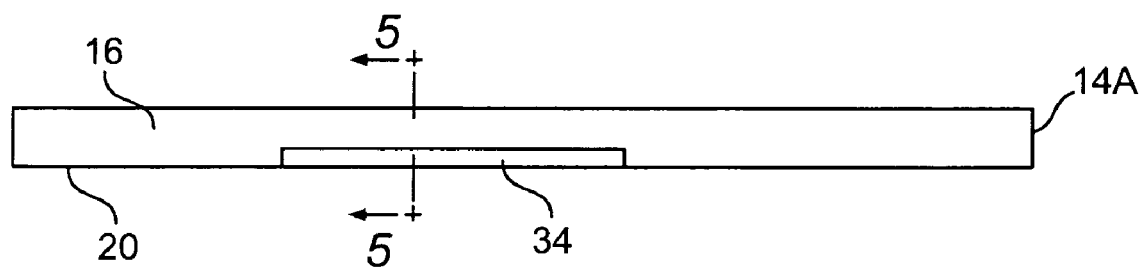
FIG. 4 is schematic top plan view of a second embodiment of a cap for an aircraft flap in accordance with the present invention.
Figure 5:
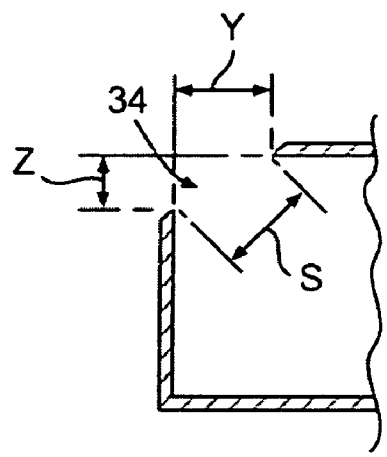
FIG. 5 is a schematic cross sectional right side elevation view of the second embodiment of the cap depicted in FIG. 4 taken along the line 5-5.

In accordance with a second exemplary embodiment of the present invention, a slot 34 is provided in a second experimental cap 14A at an intersection of top surface 16 and side surface 20 as shown in FIGS. 4 and 5. Slot 34 for the previously described flap 10 has a chord location which can be the same as slot 32 (as well as other alternate locations as noted); and dimensions y=0.0146 c and z=0.0083 c, for a diagonal opening size s=0.0167 c.

Figure 6:
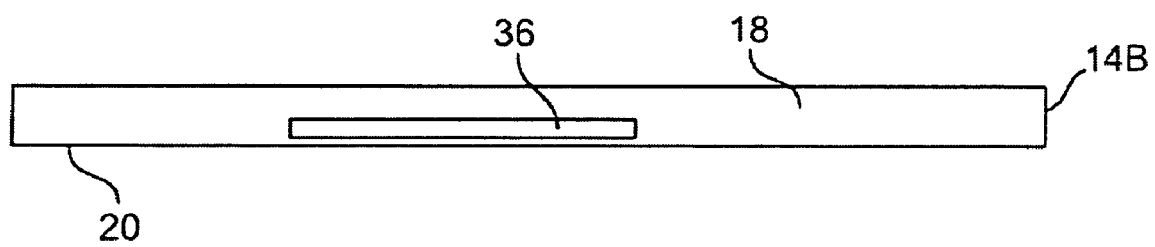
FIG. 6 is schematic bottom plan view of a third embodiment of a cap in accordance with the present invention.

In accordance with a third embodiment of the present invention, a slot 36 in a third experimental cap 14B is provided in bottom surface 18 as shown in FIG. 6. Slot 36 has a location which can be the same as slot 32 (as well as other alternate locations as noted); and dimensions which likewise can be the same as slot 32 (and hence slot 36 as depicted on cap 14B appears substantially identical to the depiction of top surface slot 32 of cap 14 in FIG. 2). And in another embodiment (whose depiction would be substantially identical to that of FIG. 4), a slot can be provided at an intersection of bottom surface 18 and side surface 20, with dimensions and locations similar to slot 34 as noted above for the flap 10.

Figure 7:
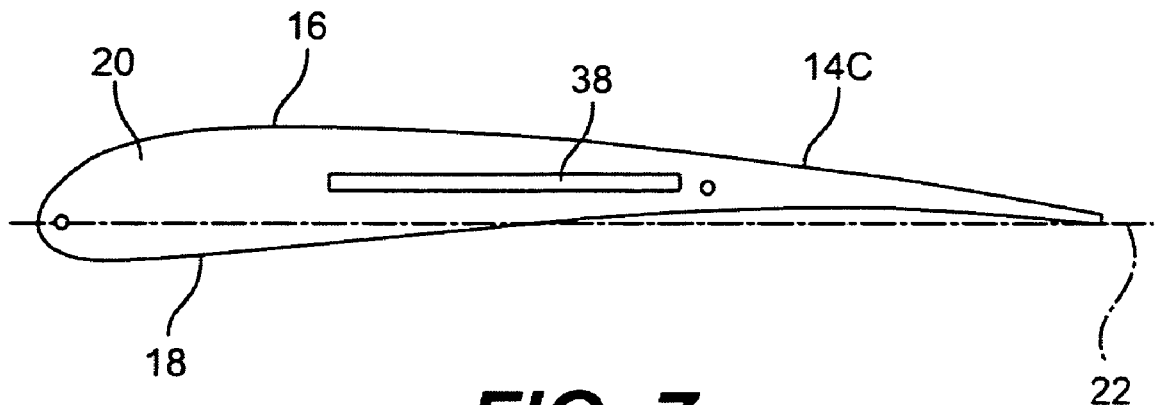
FIG. 7 is a schematic right side elevation view of a fourth embodiment of a cap in accordance with the present invention.

In accordance with a fourth depicted embodiment, a slot 38 in a fourth experimental cap 14C is provided in side surface 20 as shown in FIG. 7. Slot 38 has a location which can be the same as slot 32 (as well as other alternate locations as noted, or even further forward such as 0.2-0.43 of chord); and a width and length dimensions which likewise can be the same as slot 32. The position of slot 38 on side surface 20 is about 0.31 c above chord centerline 22.

Figure 8:
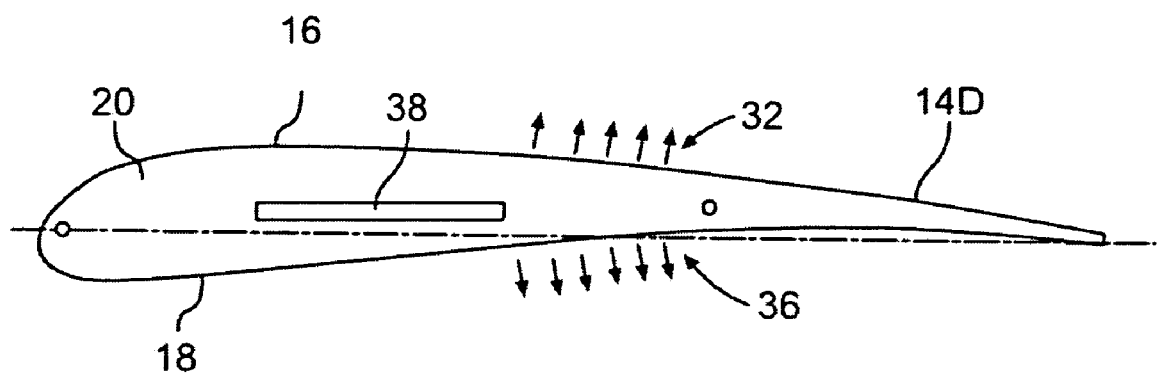
FIG. 8 is a schematic right side elevation view of a fifth embodiment of a cap in accordance with the present invention.
Figure 9:
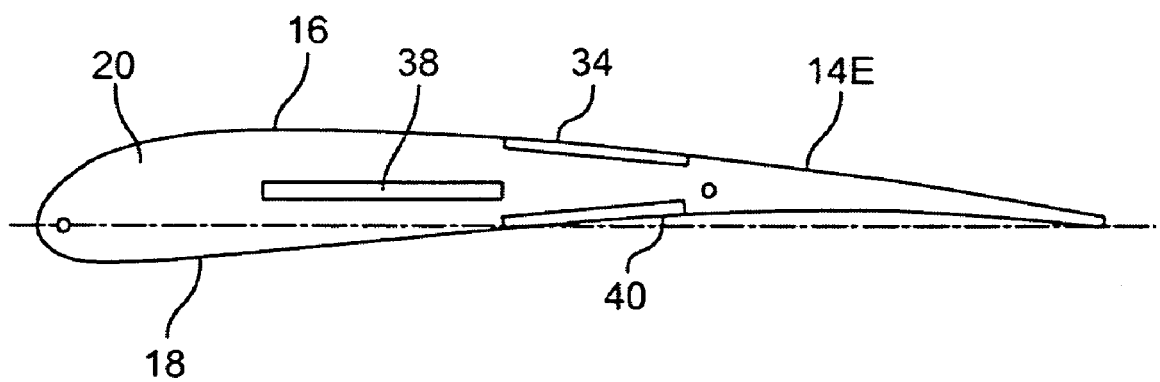
FIG. 9 is a schematic right side elevation view of a sixth embodiment of a cap in accordance with the present invention.
Figure 10:
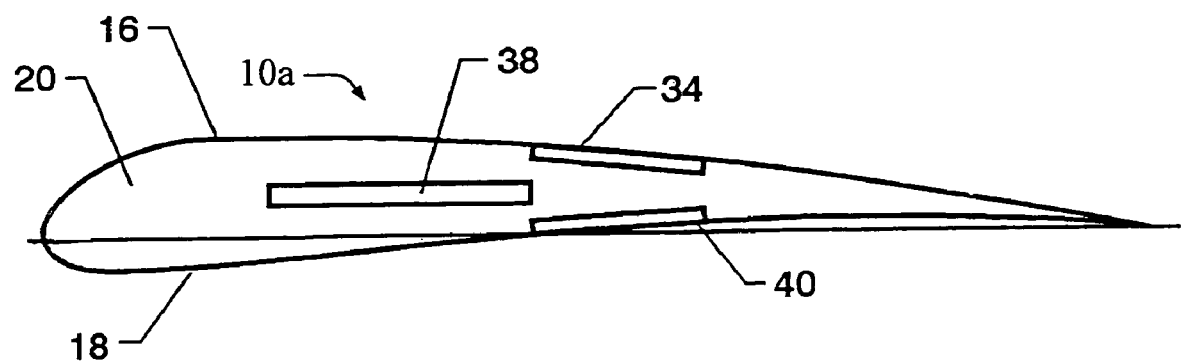
FIG. 10 is a schematic right side elevation view of an embodiment of a flap in accordance with the present invention.

In accordance with additional embodiments as schematically depicted in FIG. 8, a fifth experimental cap 14D can be provided with a slot 32 in top surface 16 (indirectly identified by the associated air flow arrows), a slot 36 in bottom surface 18 (indirectly identified by the associated air flow arrows) and/or a slot 38 provided in side surface 20. Thus, any combinations of two or three (or more) such slots can be provided as desired in the flap. Similarly, as depicted in FIG. 9, a sixth experimental cap 14E can be provided with a slot 34 at the intersection of top surface 16 and side surface 20, a slot 40 at the intersection of bottom surface 18 and side surface 20, and/or a slot 38 provided in side surface 20; and with combinations of two or three such slots as desired in the flap. Likewise, combinations of corner slots and surface slots could also be provided, with or without a side slot. FIG. 10 depicts an aircraft flap 10a in accordance with the present invention. FIG. 10 depicts the same embodiment as shown in FIG. 9, but without a cap. As explained above, in an actual aircraft flap incorporating the present invention, the present invention could be integrally incorporated into the outer side and/or end of the flap.

Some tests have been performed to check the effectiveness of the present invention at selected air flow speeds. The model used for these tests incorporated a partially hollowed flap of 4.8 inch chord, with a removable 0.25 inch wide, side edge cap such as discussed above. The air blown into the flap exited through small slots as discussed above in the side edge. Particle Image Velocimetry (PIV) measurements were performed for four flap side edge configurations. In the first configuration, a solid side edge was used, representing a baseline flap. For the other three configurations, air was respectively blown through a thin rectangular slot located on the top surface 16, the side surface 20, or the bottom surface 18 of the flap side edge. For the top surface slot, the slot extended from 50% chord to 75% chord (as measured from the flap leading edge), was 2 mm wide and was located 1 mm from the flap side edge. For the side surface slot, the slot extended from 27% chord to 60% chord, was 2 mm wide and lay 3.8 mm above the chordline. Finally, for the bottom surface slot, the slot extended along the bottom surface of the flap between 27 and 60% chord, was also 2 mm wide, and lay 1 mm from the flap bottom side edge.

The PIV measurements obtained for the top surface slot were with tip jet Mach numbers of 0.075, 0.11 and 0.17, respectively. It was seen that at 59% and 67% chord where the highest levels of the noise radiation takes place (as previously determined), the vortex was greatly weakened, as the vortex was pushed further off the top surface and its structure was deteriorated. These positive effects are accentuated as the tip jet Mach number increases. At 83% and 110% chord (i.e., downstream of where the blowing takes place), the effect of the tip jet on the vortex strength and location was still seen. The vortex was much weaker than in the baseline case and centered approximately 4 mm further above the flap. This flap configuration hence leads to a weaker shear flow coming off the flap top side edge. This should result in a reduced level of noise radiating from that edge. While the r dimension was limited to 0.75 c in the tests, it is believed that larger r dimensions extending the top surface slot closer to the flap trailing edge will result in even more noise reduction.

The PIV measurements obtained for the bottom slot were with a tip jet Mach number of 0.075, 0.11 and 0.17, respectively. The intent of blowing from the bottom surface was to deflect the shear flow that is coming off the bottom edge, i.e., forcing it to go around the edge instead of coming straight off of it. This should reduce the noise radiating from the bottom edge. For the tip jet Mach numbers of 0.11 and 0.17, it was seen at different locations that the shear layer wrapping around the flap side edge was indeed farther away from the side surface than in the baseline case. The vortex was also not able to move inboard as with the baseline configuration. It was seen, however, that although the blowing seems to displace the shear layer, it also strengthened it. The resulting expected effect on the radiated noise was not as dramatic as with the top surface slot and warrants further investigation. Blowing with a tip jet Mach number of 0.075 does not appear to have any significant effects on the flow.

The PIV measurements obtained for the side surface slot were with a tip jet Mach number of 0.075, 0.11 and 0.17, respectively. The intent of blowing from the side surface was to "build a retaining wall" to slow down the travel of the strong side vortex to the top edge, and hence to delay its merger onto the top surface and shorten the portion of the flap top surface over which the vortex strong shear layer "rubs" against the top edge (causing noise to radiate). The PIV results seemed to indicate that the opposite effect was achieved. For the three tip jet Mach numbers tested, the merging of the side vortex to the top surface was accelerated. The blowing only contributed to "feed" the shear layer and strengthen the vortex system. Nonetheless, it is expected that higher air flow rates through the slot than those tested would provide the desired noise reduction.

From the above experiments, it was shown that reduction of noise radiating from the flap side was greater by blowing air from a slot located along the top surface of the flap. This blown air greatly weakened the top vortex system and pushed it further off the top surface. These beneficial effects occurred with the lowest tip jet Mach number tested and were accentuated at the higher tip jet speeds. Blowing from the bottom surface was found to strengthen but also to deflect and push the shear layer away from the flap edge, keeping the strong side edge vortex further outboard. Because this was only observed for the two highest tip jet Mach numbers, this means that the beneficial effects are more likely to be achieved only with high enough tip jet speeds.

While the present invention has been described with respect to exemplary embodiments thereof, it will be understood by those of ordinary skill in the art that variations and modifications can be effected within the scope and spirit of the invention.

What is claimed as new and desired to be secured by Letters Patent of the United States is:

1. An aircraft flap which reduces noise radiating from a side thereof when the flap is deployed comprising:
    an outer surface having at least one slot;
    said at least one slot being located on or adjacent to the side of the flap;
    a mechanism which forces air out through said at least one slot when the flap is deployed; and
    said at least one slot being configured to direct the forced air to exit in a direction substantially away from said outer surface and toward a vortex formation region along a side edge of the flap, to thereby reduce noise radiating from the flap.

2. An aircraft flap which reduces noise as claimed in claim 1, wherein said at least one slot is located on a top surface of the flap.

3. An aircraft flap which reduces noise as claimed in claim 1, wherein said at least one slot is located on a bottom surface of the flap.

4. An aircraft flap which reduces noise as claimed in claim 1, wherein said at least one slot is located on a side surface of the flap.

5. An aircraft flap which reduces noise as claimed in claim 1, wherein said at least one slot is located at an intersection of a side surface and a top surface of the flap.

6. An aircraft flap which reduces noise as claimed in claim 1, wherein said at least one slot is located at an intersection of a side surface and a bottom surface of the flap.

7. An aircraft flap which reduces noise as claimed in claim 1, wherein said at least one slot comprises at least two slots located respectively at two locations of a group of locations comprising a top surface of the flap, a bottom surface of the flap, an intersection of the top and side surface of the flap, an intersection of the bottom and side surfaces of the flap, and a side surface of the flap.

8. An aircraft flap which reduces noise as claimed in claim 1, wherein said mechanism includes a device which adjusts a rate of the air forced out through said at least one slot.

9. An aircraft flap which reduces noise as claimed in claim 1,
    wherein a forward end of the at least one slot is located into the end of a vortex formation region and the at least one slot extends into a region of maximum noise generation.

10. An aircraft flap which reduces noise as claimed in claim 1, and wherein said at least one slot is substantially rectangular.

11. An aircraft flap which reduces noise radiating from a side thereof when the flap is deployed comprising:
    an outer surface having at least one slot;
    said at least one slot being located on or adjacent to the side of the flap;
    a mechanism which forces air out through said at least one slot when the flap is deployed;
    said at least one slot being configured to direct the forced air to exit in a direction substantially away from said outer surface; and
    wherein said at least one slot comprises at least slots located respectively at at least three locations of a group of locations comprising a top surface of the flap, a bottom surface of the flap, an intersection of the top and side surface of the flap, an intersection of the bottom and side surfaces of the flap, and a side surface of the flap.

12. A method for reducing noise radiating from a side of a deployed flap of an aircraft wing, the flap having an outer surface, comprising the steps of:
    locating a slot on or adjacent the side of the flap; and
    forcing air out through the slot in a direction substantially away from the outer surface of said flap and toward a vortex formation region along a side edge of the flap when the flap is deployed, to thereby reduce noise radiating from the side of the flap.

13. A method for reducing noise as claimed in claim 12, wherein the slot is located on a top surface of the flap.

14. A method for reducing noise as claimed in claim 12, wherein the slot is located on a bottom surface of the flap.

15. A method for reducing noise as claimed in claim 12, wherein the slot is located on a side surface of the flap.

16. A method for reducing noise as claimed in claim 12, wherein the slot is located at an intersection of a side surface and a top surface of the flap.

17. A method for reducing noise as claimed in claim 12, wherein the slot is located at an intersection of a side surface and a bottom surface of the flap.

18. A method for reducing noise as claimed in claim 12, wherein there are at least two of the slots located respectively at at least two locations of a group of locations comprising a top surface of the flap, a bottom surface of the flap, an intersection of the top and side surface of the flap, an intersection of the bottom and side surfaces of the flap, and a side surface of the flap.

19. A method for reducing noise as claimed in claim 12, and further including the step of adjusting a rate of the air forced out through the slot.

20. A method for reducing noise as claimed in claim 12, wherein the locating step locates a forward end of the slot at least about 0.27 of chord.

21. An aircraft flap which reduces noise radiating from a side thereof when the flap is deployed comprising:
- at least one slot located on or adjacent the side of the flap; and
- a mechanism which forces air out through said at least one slot when the flap is deployed; and
- wherein said at least one slot comprises at least slots located respectively at at least three locations of a group of locations comprising a top surface of the flap, a bottom surface of the flap, an intersection of the top and side surface of the flap, an intersection of the bottom and side surfaces of the flap, and a side surface of the flap.

* * * * *